June 16, 1942. H. H. TALBOT 2,286,694
VARIABLE SPEED DRIVE
Filed Sept. 7, 1940

INVENTOR.
Howard H. Talbot
J. E. Dickinson
BY
ATTORNEYS.

WITNESSES.
A. B. Wallace.

Patented June 16, 1942

2,286,694

UNITED STATES PATENT OFFICE 2,286,694

VARIABLE SPEED DRIVE

Howard H. Talbot, Pittsburgh, Pa., assignor to United Engineering and Foundry Company, Pittsburgh, Pa., a corporation of Pennsylvania Application September 7, 1940, Serial No. 355,790

7 Claims. (Cl. 74—69)

This invention relates to apparatus for converting uniform rotational or angular velocity of a driving shaft, or an equivalent member, into variable rotational or angular velocity of a driven shaft, or an equivalent member, and has for its general object to provide an improved variable speed drive of the type disclosed in my prior Patent No. 2,087,513.

That patent discloses a variable speed drive for a rotary flying shear adapted to cut strip metal and the like into variable predetermined lengths. The drive comprises coaxially aligned driving and driven shafts each having attached to one of its ends a crank arm that is provided with a radial slot to slidably receive a wrist pin. Positioned between these crank arms there is a power transmitter comprising a shaft whose axis of rotation is parallel to that of the driving and driven shafts, the transmitter shaft having attached to its ends crank arms that are provided with wrist pins which engage the slots in the crank arms of the driving and driven shafts. Provision is made for adjusting the transmitter shaft laterally so that the position of its axis with relation to that of the driving and driven shafts may be varied to the end that the peripheral speed of the shear blades may be the same as the linear speed of the strip at the time it is sheared. Adjacent to its ends the transmitter shaft is rotatably mounted in bearings which are supported in a rather massive box-like housing which is adjustably mounted in a frame to thus variably position the axis of rotation of the shaft.

Because the power imparted to and delivered by the transmitter shaft acts upon and through the crank arms attached to its ends which extend beyond the housing in which it is mounted and which are widely spaced apart, there are such substantial unbalanced forces acting upon this shaft that it tends strongly to wabble in its bearings. It is adequately to resist this tendency that the transmitter shaft is mounted in a massive space-consuming housing, and in addition thereto special provision is made for releasably clamping the shaft housing in the frame which carries it.

While, as stated, the general object of my invention is to improve variable speed drives of the type disclosed in my above mentioned patent, a more specific object is to provide a variable speed drive of that type in which the wabbling tendency of the transmitter shaft is greatly reduced or entirely eliminated, with the result that expensive space-taking mechanism to resist that tendency is eliminated.

Figure 1:
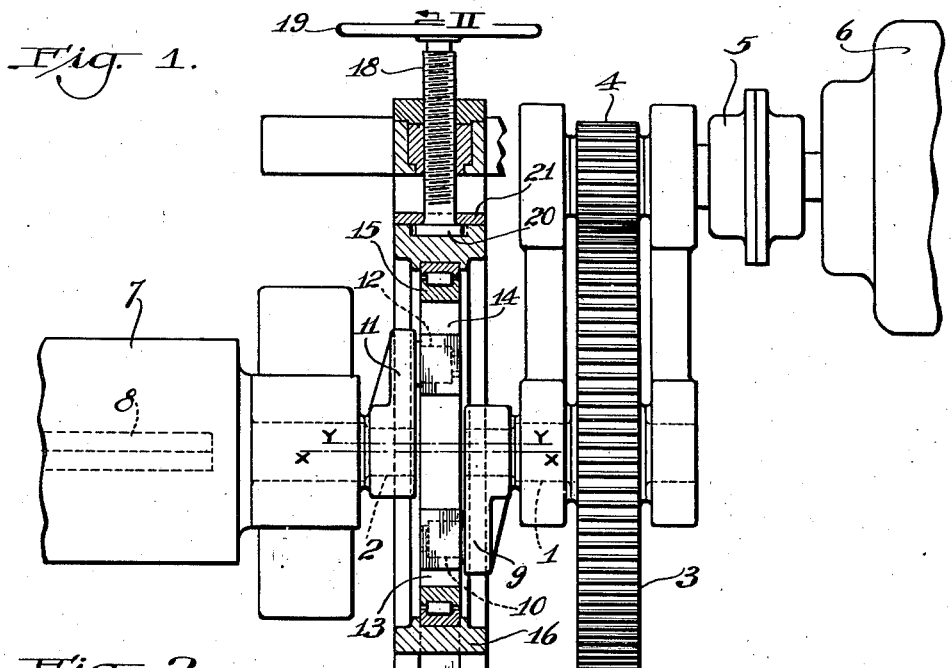
Figure 2:
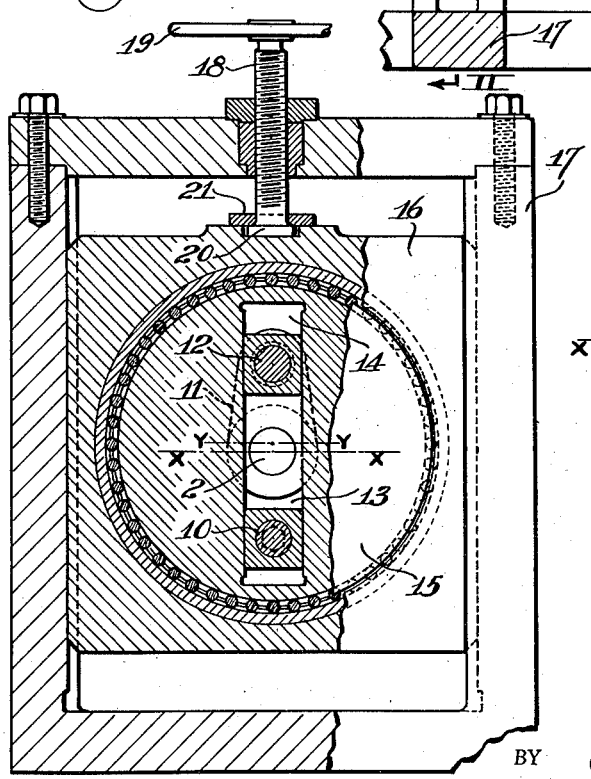

The invention is illustrated in the accompanying drawing in which Fig. 1 is a view partly in plan and partly in section of a flying shear equipped with one embodiment of my improved variable speed drive; Fig. 2 a vertical sectional view of the power transmitter taken on the line II—II of Fig. 1; and Fig. 3 a horizontal central sectional view through a modified form of transmitter.

The variable speed drive provided according to my invention includes coaxial driving and driven shafts, or equivalent members, having adjacent ends each provided with a crank arm. Between these arms there is a cylindrical disklike power transmitter whose periphery lies outside of the orbits of the outer ends of the crank arms and is rotatably mounted in a bearing contained in a block which is adjustably supported by a housing so that the axis of rotation of the transmitter may be variably positioned with relation to the common axis of the driving and driven shafts. The transmitter and the crank arms of the driving and driven shafts are suitably provided with interengaging slots and wrist pins in a manner the same as or similar to that disclosed in my above mentioned patent, and for the same purpose. However, by reason of the bearing of the transmitter being outside the orbits of the crank arms, the points of application of power through the wrist pins and slots lie in or close to the central plane of the transmitter that is perpendicular to its axis of rotation. Thus the tendency of the transmitter to wabble is greatly reduced or entirely eliminated.

Having reference to the embodiment of my invention illustrated in Figs. 1 and 2, driving and driven shafts 1 and 2 are rotatably mounted on a common axis X—X, the driving shaft being provided with a gear 3 which meshes with a pinion 4 attached to the armature shaft 5 of a constant speed driving motor 6. The driven shaft 2 is shown as being directly connected to a drum 7 of a flying shear equipped with a cutter 8. Attached to the end of driving shaft 1 there is a crank arm 9 which is provided with a wrist pin 10, and similarly at the end of driven shaft 2 there is attached a crank arm 11 provided with a wrist pin 12. The wrist pins of these arms lie in and are engaged by the side walls of slots 13 and 14 disposed radially in a disk-like transmitter 15 whose periphery lies outside the orbits of the outer ends of crank arms 9 and 11, the arrangement being such that the centers of application of power through the wrist pins and slots lie in the central plane of the transmitter that is perpendicular to its axis of rotation. With such application of power there is no tendency for the transmitter to wabble.

The transmitter is rotatably mounted, preferably by roller bearings as indicated, in a block 16, which in turn is slidably mounted in a suitable housing 17. Various instrumentalities may be used to variably position the axis of rotation of the transmitter, indicated at Y—Y, laterally of the common axis of rotation X—X of the driving and driven shafts 1 and 2. As shown, a screw 18, provided with a hand wheel 19 for turning it, is rotatably mounted in housing 17 and is provided at its inner end with a shoulder 20 which is engaged by an inwardly turned flange of a clamping ring 21 attached to block 16. By rotating hand wheel 19 screw 18 may be moved inwardly or outwardly of housing 17 to so position block 16 that the axis of rotation Y—Y of the transmitter may be placed at any desired distance from the axis X—X of the driving and driven shafts.

Figure 3:
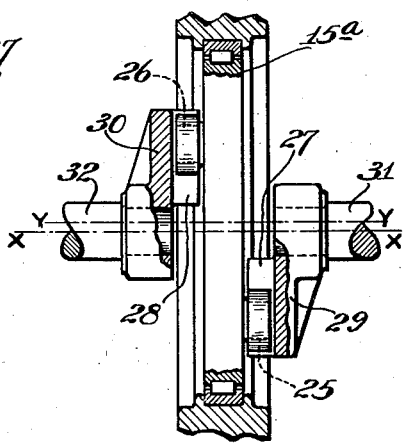

The embodiment of my invention illustrated in Fig. 3 is the same as that shown in Figs. 1 and 2, except for the connections between the transmitter and the driving and driven shafts. As shown in Fig. 3, a transmitter 15a is provided with laterally projecting wrist pins 25 and 26 which are received by slots 27 and 28 formed in the adjacent faces of crank arms 29 and 30 attached to the ends of driving and driven shafts 31 and 32, respectively. In this embodiment of the invention, the centers of the application of power through the wrist pins and slots lie slightly on opposite sides of the central plane of the transmitter that is perpendicular to its axis of rotation, but because the transmitter is of disklike shape these centers of application of power lie close to such plane, and accordingly there is little tendency for the transmitter to wabble.

In the operation of the apparatus, referring to Figs. 1 and 2, driving shaft 1 is normally driven at a constant or uniform number of revolutions per minute. If the axis of rotation Y—Y of transmitter 15 is positioned to coincide with the axis X—X of the driving and driven shafts, the peripheral speed of the driven shaft, as well as that of shear drum 7, will be constant throughout each revolution, and their angular speeds throughout each revolution will be the same as that of the driving shaft. Under such conditions strip being fed through the shear at a uniform lineal speed which is the same as the peripheral speed of the cutter will be sheared into uniform lengths, the speed of the cutter being the same as that of the strip at the time of cutting. Assuming that it is desired to cut the strip into greater lengths, and that the rate of rotation of the driving shaft is not changed, the strip may be fed to the shear at an increased lineal velocity and the axis Y—Y of the transmitter moved laterally from the axis X—X of the driving and driven shafts a distance, which may readily be calculated, sufficient to cause a shear cutter to travel at a peripheral speed the same as the lineal speed of the strip at the time the strip is cut.

According to the provisions of the patent statutes I have explained the principle and mode of operation of my invention and have illustrated and described specific embodiments of it. However, I desire to have it understood that, within the scope of the appended claims, the invention may be practiced by forms of apparatus other than those illustrated and described.

I claim:

1. In a variable speed drive, the combination of coaxial rotatable driving and driven shafts having adjacent ends each provided with a crank arm, a cylindrical disk-like power transmitter positioned between said shaft ends and having its periphery lying outside of the orbits of the outer ends of said crank arms, a bearing in which the periphery of said transmitter is rotatably mounted, said crank arms and transmitter being provided the one with radially extending slots and the other with a wrist pin on each face engaged by said slots, and means for moving said transmitter to position its axis at desired distances from the axis of said shafts.

2. In a variable speed drive, the combination of coaxial rotatable driving and driven members each having a crank arm provided with a wrist pin disposed in a common plane perpendicular to the axis of said members, a power transmitter positioned between and rotatably mounted on an axis parallel to that of said driving and driven members, said transmitter being provided with radially extending slots which receive said wrist pins, and means for moving said transmitter to position its axis at desired distances from the axis of said driving and driven members.

3. In a variable speed drive, the combination of coaxial rotatable driving and driven shafts having adjacent ends provided with a crank arm, a cylindrical disk-like power transmitter positioned between said shafts ends and having its periphery lying outside of the orbits of the outer ends of said crank arms, a bearing in which the periphery of said transmitter is rotatably mounted, said transmitter being provided with radially extending slots and each of said crank arms being provided with a wrist pin engaging said slots, and means for moving said transmitter to position its axis at desired distances from the axis of said shafts.

4. In a variable speed drive, the combination of coaxial rotatable driving and driven shafts having adjacent ends provided with a crank arm, a cylindrical disk-like power transmitter positioned between said shaft ends and having its periphery lying outside of the orbits of the outer ends of said crank arms, a bearing in which the periphery of said transmitter is rotatably mounted, said crank arms being provided with radially extending slots and said transmitter being provided with wrist pins one on each face and diametrically opposed for engaging said slots, and means for moving said transmitter to position its axis at desired distances from the axis of said shafts.

5. In a variable speed drive the combination of coaxial rotatable driving and driven shafts having adjacent ends provided with a crank arm, a cylindrical disc-like power transmitter, provided with a diametrically extending slot, said transmitter being positioned between the ends of said shafts and having its periphery lying outside of the orbits of the outer ends of said crank arms, a bearing in which said disc-like member is rotatably mounted, each of said crank arms provided with a wrist pin for cooperatively engaging the slot of said disc-like member, means for moving said transmitter to adjustably offset its axis with respect to the axis of said shafts, and guide means in which said bearing is slidably confined.

6. A variable speed drive comprising coaxial rotatable driving and driven shafts the adjacent ends of which are provided with a crank arm, a circular power transmitter positioned between the ends of said shafts and having its periphery lying outside of the orbits of said crank arms, a bearing in which said circular member is rotatably mounted, a wrist pin secured to each of said crank arms, said wrist pins each being disposed to engage a radially extending slot provided in the transmitter for its reception, guide means slidably engaging said bearing to permit limited movement thereof, and means secured to said guide means and said bearing for positioning said transmitter at desired distances from the axis of said shafts.

7. A variable speed drive, according to claim 1, in which the power transmitter is mounted for movement in an anti-friction bearing.

HOWARD H. TALBOT.

CERTIFICATE OF CORRECTION.

Patent No. 2,286,694. June 16, 1942.

HOWARD H. TALBOT.

It is hereby certified that error appears in the printed specification of the above numbered patent requiring correction as follows: Page 1, first column, line 8, for the patent number "2,087,513" read --2,067,513--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.